3,565,880
MIXED CHROMIUM CONTAINING MONOAZO
DYESTUFF COMPLEXES
Marcel Georges Jirou and Claude Marie Henri Emile Brouard, Sotteville-les-Rouen, France, assignors to Ugine Kuhlmann, Paris, France, a French corporation
No Drawing. Filed Sept. 20, 1966, Ser. No. 580,576
Claims priority, application France, Sept. 24, 1965, 32,512
Int. Cl. C09d 45/16; D06p 1/02
U.S. Cl. 260—145     1 Claim

ABSTRACT OF THE DISCLOSURE

Chromium containing mixed complexes represented by the general formula:

(I)—Cr—(II)

where (I) represents the residue of a monoazo dye of the general formula:

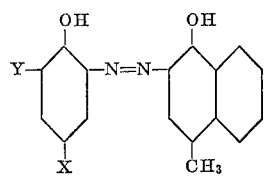

where X and Y are each hydrogen or chlorine atoms or nitro groups and (II) is the residue of a monoazo dye of the general formula:

$A-N=N-B$ where A represents a radical of an o-aminophenol or o-aminonaphthol containing an —$SO_3H$ group and B represents the radical of a hydroxyl containing coupling compound, for example a naphthol, coupling in a position ortho to the functional —OH group.

---

The present invention deals with new chromium containing mixed complexes represented by the general formula:

(I)—Cr—(II)     (III)

where (I) represents the residue of a monoazo dye of the general formula:

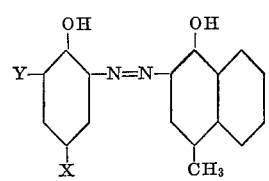

(I)

where X and Y are each hydrogen or chlorine atoms or nitro groups and (II) is the residue of a monoazo dye of the general formula:

$A-N=N-B$ where A represents a radical of an o-aminophenol or o-aminonaphthol containing an —$SO_3H$ group and B represents the radical of a hydroxyl containing coupling compound, for example a naphthol, coupling in a position ortho to the functional —OH group.

The monoazo dyes of Formula I, may be prepared in a known manner by coupling in an alkaline medium. Suitable diazotizable compounds are for example, 4-chloro-1-hydroxy-2-amino-benzene,
4,6-dichloro-1-hydroxy-2-amino-benzene,
4-nitro-1-hydroxy-2-amino-benzene or
4,6-dinitro-1-hydroxy-2-amino-benzene The mixed complexes of Formula III may be obtained for example by reacting, in an alkaline aqueous medium a chromium complex of an o-hydroxy aliphatic or aromatic carboxylic acid, such as salicylic or tartaric acid, with an equimolecular mixture of dyestuffs of Formulae I and II. It is also possible for example to react, in an alkaline aqueous medium, a 1:1 chromium complex of a dyestuff of Formula II with a dyestuff of Formula I.

The mixed complexes obtained in this manner are particularly convenient for dyeing, preferably in a weak organic acid medium, for example in acetic acid medium, animal fibres, such as silk, leather or wool, synthetic fibres based on polyamides or polyurethanes, and also mixed fibres, for example wool-polyamides. The resulting colours are fast to rubbing and to wet tests and have excellent fastness to light.

The invention is illustrated by but not limited to the following examples in which the amounts used are expressed in parts by weight and the temperatures in degrees centigrade.

EXAMPLE 1

43.9 parts of

[6-nitro-4-sulpho-2-hydroxy-naphthalene]-<1 azo 1>-[2-hydroxy-naphthalene]

and 32.3 parts of 5'-nitro-2'-hydroxy-2-phenylazo-4-methyl-1-naphthol are mixed in 600 parts of water. The mixture is heated to 90–95° C. and the pH is adjusted to 10 by the addition of caustic soda. Next 333 parts of a solution of sodium chromosalicylate containing 5.2 parts of chromium are added and the mixture is maintained for 3 hours at 90–95° C. The mixed chromium-containing dyestuff which is obtained is brought down by the addition of 300 parts of sodium chloride and is dried. This dyestuff dyes wool and polyamides to a black shade which has very good general fastness.

EXAMPLE 2

43.9 parts of a chromium complex of

[6 - nitro-4-sulpho-2-hydroxy-naphthalene]-<1 azo 1>-[2-hydroxy-naphthalene]

containing one atom of chromium per molecule of the monoazo dye, and 32.9 parts of 5'-nitro-2'-hydroxy-2-phenylazo-4-methyl-1-naphthol are mixed in 600 parts of water. The mixture is heated to 90–100° C. and 16.8 parts of caustic soda are added so that the pH is maintained at 10–12. The reaction mixture is maintained at 90–100° C. until the monoazo dye disappears. The mixed chromium-containing dyestuff is brought down by the addition of sodium chloride and is dried. This dyestuff dyes wool and polyamides to a black shade which has very good general fastness. Mixtures of these two fibres show no differences in shade between the fibres.

The following table gives other examples of chromium-containing mixed complexes prepared from monoazo dyes of Formulae I and II according to the methods of Examples 1 and 2.

| Example | I | + | II | Colour |
|---|---|---|---|---|
| 3 | 3',5'-dinitro-2'-hydroxy-2-phenylazo-4-methyl-1-naphthol. | | [6-nitro-4-sulpho-2-hydroxy-naphthalene]-<1 azo 1>-[2-hydroxy-naphthalene]. | Greenish black. |
| 4 | 5'-chloro-2'-hydroxy-2-phenylazo-4-methyl-1-naphthol | | [4-sulpho-2-hydroxy-naphthalene]-<1 azo 1>-[2-hydroxy-naphthalene]. | Marine blue. |
| 5 | 5'-nitro-2'-hydroxy-2-phenylazo-4-methyl-1-naphthol | | [6-nitro-4-sulpho 2-hydroxy-naphthalene]-<1 azo 2>-[1-hydroxy-naphthalene]. | Reddish black. |

We claim:
1. A chromium-containing mixed complex which contains one atom of chromium bound in complex union with one molecule of a dyestuff of the formula:

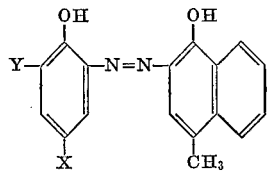

wherein each X and Y represents hydrogen, chlorine or nitro, and with one molecule of a dyestuff of the formula:

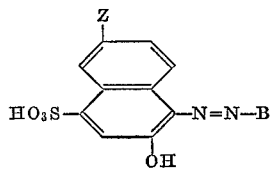

wherein Z represents hydrogen or nitro and B represents the 1-hydroxy-2-naphthyl or 2-hydroxy-1-naphthyl radical.

References Cited
UNITED STATES PATENTS 2,906,746    9/1959    Brassel et al.    260—145
3,163,634    12/1964    Conrad    260—145

CHARLES B. PARKER, Primary Examiner

D. M. PAPUGA, Assistant Examiner

U.S. Cl. X.R.

260—150, 194, 197; 8—13, 43, 55